United States Patent [19]

Carlson

[11] 4,273,841
[45] Jun. 16, 1981

[54] TERNARY ELECTROLYTE FOR SECONDARY ELECTROCHEMICAL CELLS

[75] Inventor: Eric J. Carlson, Reminderville, Ohio

[73] Assignee: General Electric Company, Schenectady, N.Y.

[21] Appl. No.: 178,373

[22] Filed: Aug. 14, 1980

[51] Int. Cl.³ .......................................... H01M 10/26
[52] U.S. Cl. .................................. 429/199; 429/207; 429/229
[58] Field of Search ............... 429/207, 206, 203, 188, 429/46, 199, 229, 231

[56] References Cited

U.S. PATENT DOCUMENTS

| | | | |
|---|---|---|---|
| 389,882 | 9/1888 | Faure | 429/206 |
| 2,952,572 | 9/1960 | Johnson | 429/203 |
| 3,051,768 | 8/1962 | Kujas | 429/199 |

Primary Examiner—Anthony Skapars
Attorney, Agent, or Firm—Jane M. Binkowski; James C. Davis, Jr.; Leo I. MaLossi

[57] ABSTRACT

An aqueous alkaline solution comprised of 5 weight % to 10 weight % KOH, 5 weight % to 15 weight % KF and 10 weight % to 20 weight % $K_3PO_4$ is used as an electrolyte in a secondary electrochemical cell wherein the active material of one of the electrodes is a zinc-active material.

5 Claims, 3 Drawing Figures

TERNARY ELECTROLYTE FOR SECONDARY ELECTROCHEMICAL CELLS

This invention relates to an aqueous alkaline ternary $KOH/KF/K_3PO_4$ solution for use as an electrolyte in a secondary electrochemical cell wherein the active material of one of the electrodes is a zinc-active material.

Secondary electrochemical cells with alkaline electrolyte and zinc negative electrodes have limited cycle life because of the zinc electrode, i.e. because of redistribution of the zinc active material. Specifically, because the zinc discharge products are highly soluble in the electrolyte, secondary zinc electrodes suffer from slumping, shape change, densification and dendrite growth. On recharge, the zinc active material does not replate in its original form and location, and under some charging conditions, plates in the form of dendrites which can short to the positive plate.

One approach to alleviating these problems is to modify the electrolyte (usually 4 to 10 M KOH) to reduce the solubility of the zinc discharge products. A modified electrolyte must allow reasonable rates of charge and discharge of the zinc and the positive electrodes over a useful temperature range and possess sufficient ionic conductivity to allow a finished cell to have a low internal resistance.

Ser. No. 067,696, now abandoned and Ser. No. 067,695, both filed Aug. 20, 1979 in the name of R. F. Thornton and assigned to the assignee hereof, disclose a binary electrolyte. Ser. No. 067,696 discloses an electrolyte of 5 to 18% phosphoric acid ($H_3PO_4$) and 15 to 31% potassium hydroxide (KOH), and Ser. No. 067,695 discloses 18 to 30% potassium fluoride (KF) and 15 to 2% potassium hydroxide (KOH), respectively. Although each of the disclosed binary electrolytes shows a decrease in zinc solubility, dendrite formation and electrode shape change, there was also a decrease in rate capability and cell discharge capacity.

The present aqueous $KF/K_3PO_4/KOH$ electrolyte retains the ability of the aforementioned binary electrolytes to inhibit slumping, shape change, densification and dendrite growth by also having a low solubility for the zinc discharge products. However, the present ternary electrolyte shows a significant improvement in performance over the aforementioned binary electrolytes. Specifically, the present ternary electrolyte exhibits the charge characteristics of the aforementioned $KOH/KF$ electrolyte and the discharge characteristics of the aforementioned $KOH/K_3PO_4$ electrolyte.

Briefly stated, the present invention is directed to a secondary electrochemical cell wherein the active material of one of the electrodes is a zinc-active material and wherein the elctrolyte is comprised of an aqueous solution of 5 to 10 weight % potassium hydroxide, 5 to 15 weight % potassium fluoride and 10 to 20 weight % potassium phosphate with the remaining weight % being water.

In the present electrolyte solution, KOH in an amount higher than 10 weight % is not useful because of its deteriorating effect on the negative zinc electrode whereas amounts of KOH lower than 5 weight % are not practical due to the resulting decrease in rate capability and capacity. Amounts of KF lower than 5 weight % cause a deterioration of charge characteristics of the electrolyte whereas reduction of $K_3PO_4$ below 10 weight % diminishes rate capability. On the other hand, the dissolved salt content of the present electrolyte should not exceed about 45 weight % since with a salt content higher than about 45 weight %, conductivity of the electrolyte is decreased and low temperature performance suffers.

The particular formulation of the present electrolyte depends largely on the specific battery properties desired. Preferably, the present electrolyte is an aqueous solution of 7.5 weight % potassium hydroxide, 12.0 weight % potassium fluoride and 16.0 weight % potassium phosphate.

As used herein active material is electrode material that undergoes electrochemical oxidation or reduction.

Representative of the zinc active material of the negative electrode in the present secondary electrochemical cell is elemental zinc, or a compound of zinc such as zinc oxide, or mixtures thereof.

The present electrolyte is particularly useful in a secondary electrochemical cell wherein the active material of the positive electrode is preferably $NiOOH/Ni(OH)_2$.

Those skilled in the art will gain a further and better understanding of the present invention from the detailed description set forth below, considered in conjunction with the figures accompanying and forming a part of the specification wherein the performance of the present electrolyte, Run 5, is compared with that of other electrolytes in which.

EXAMPLE

A number of aqueous electrolyte solutions were prepared, and their compositions, expressed in weight %, are given in Table I.

TABLE I

| | Composition (wt %) | | |
|---|---|---|---|
| Run | KOH | KF | $K_3PO_4$ |
| 1 | 31 | X | X |
| 2 | 4.8 | 26.8 | X |
| 3 | 7.5 | 24.3 | X |
| 4 | 4.3 | X | 32.7 |
| 5 | 7.5 | 12.0 | 16.0 |

The performance characteristics of the electrolytes listed in Table I were compared by cycling the electrolytes in identically constructed positive limited Ni/Zn cells with a theoretical positive capacity equal to 0.79 AH and a negative capacity of 1.52 AH. Specifically, the zinc electrode had an initial formulation comprised of a mixture of zinc oxide and a minor amount of elemental zinc powder with a polymer binder in an amount of 2 weight % or less of the mixture. The active material of the positive electrode was $NiOOH/Ni(OH)_2$.

The discharge characteristics and total capacity were determined at room temperature by subjecting the cells to a step discharge (successive discharges of 1 ampere, 200 mA, 40 mA, and 10 mA; each with a voltage cutoff of 1.00 volts) following the initial formation charge. The results of these discharges are summarized in FIG. 1.

Figure 1:
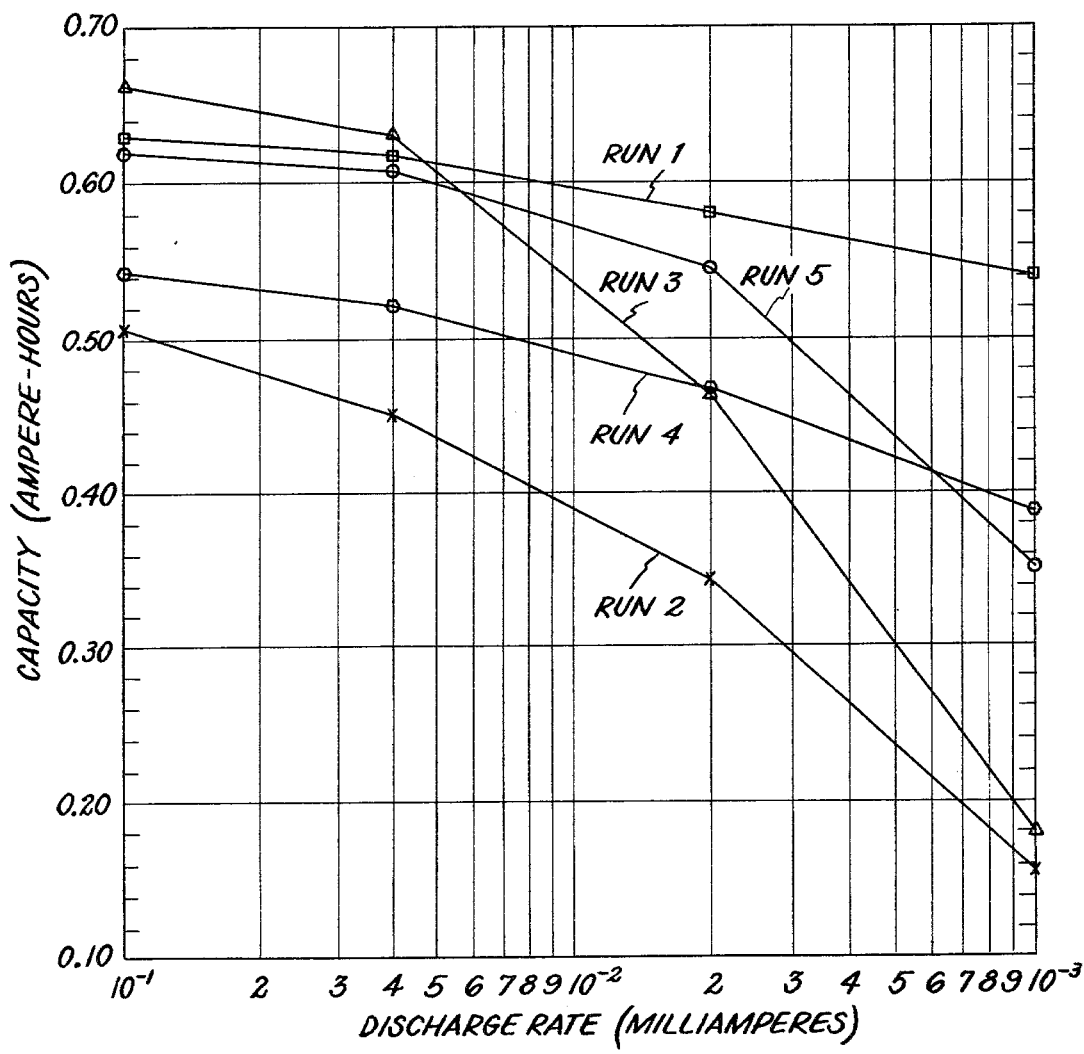
FIG. 1 shows the cumulative discharge capacity on the initial step discharge.

Run 5 utilizing the present ternary electrolyte illustrates the present invention. Specifically, FIG. 1 shows that the ampere capacity of Run 5 is approximately twice that of the KOH/KF electrolytes of Runs 2 and 3, and equivalent to the KOH/K$_3$PO$_4$ electrolyte of Run 4. Also, the total capacity of the present ternary electrolyte of Run 5 equals that of the binary electrolyte of Run 3 and that of KOH of Run 1 (small differences exist because of variations in the formation charge) FIG. 1 also shows that the KF/KOH electrolyte of Run 2 and the KOH/K$_3$PO$_4$ electrolyte of Run 4 have significantly less total capacity than that of the present electrolyte.

Figure 2:
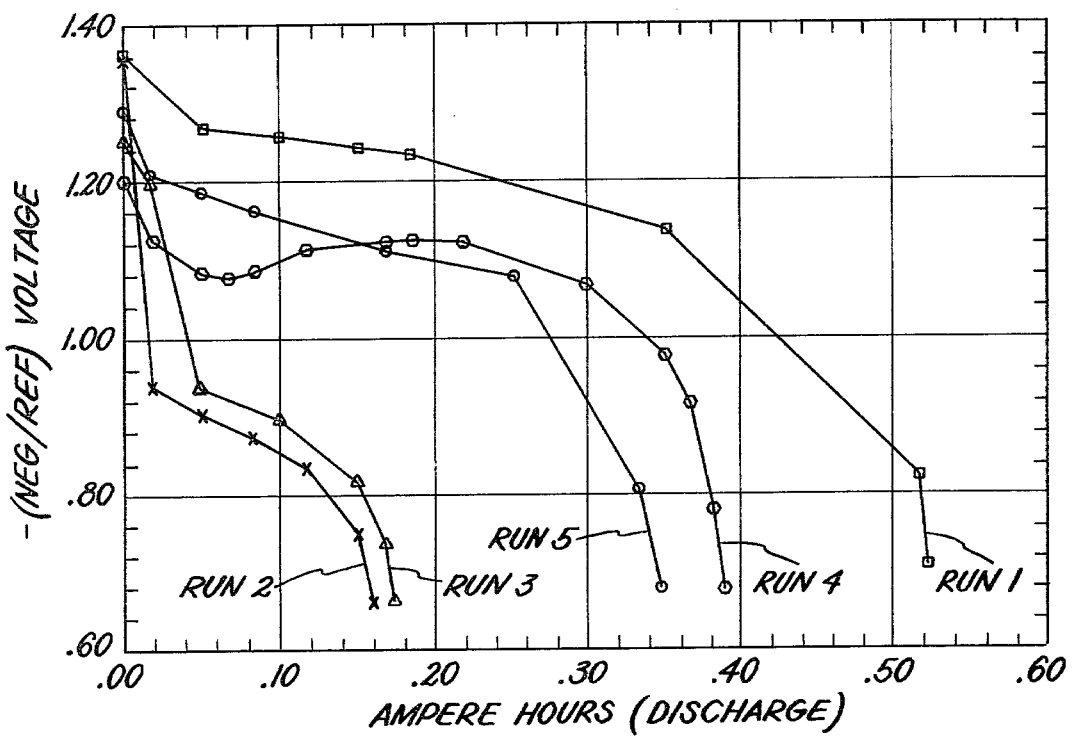
FIG. 2 shows the polarization of the negative (zinc) electrode during the 1 ampere discharge segment of the step discharge (FIG. 1)

The polarization (voltage vs. capacity) curves of the zinc electrode in the different electrolytes during the 1 ampere discharge are compared in FIG. 2. Specifically, FIG. 2 shows that the present ternary electrolyte has similar discharge characteristics as the KOH/K$_3$PO$_4$ electrolyte of Run 4. At the same time the ternary electrolyte polarizes less than the binary KF/KOH electrolytes of Runs 2 and 3. It was determined that the positive (nickel) electrode behaved in a similar fashion in all the electrolytes.

Figure 3:
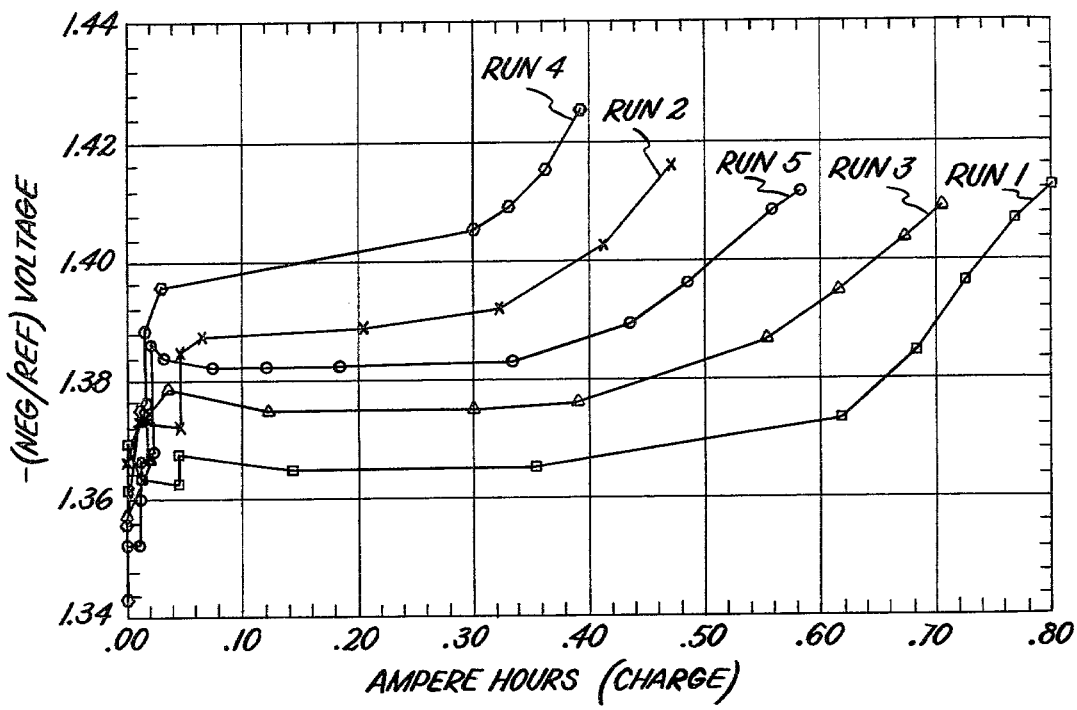
FIG. 3 shows the polarization of the negative (zinc) electrode during the charge following the step discharge.

The polarization curves for the zinc electrode for the charge following the step discharge are given in FIG. 3. The ternary electrolyte, i.e. Run 5, has intermediate charge acceptance characteristics between the KOH/K$_3$PO$_4$ of Run 4 and the KOH/KF electrolytes of Runs 2 and 3. The current during the initial period of the constant current charge was 10 mA. This was then raised to 50 mA (after ~0.02-0.05 AH). The cells were charged at 50 mA until the total cell voltage exceeded 1.90 volts, at which time the charge was stopped.

In both charge and discharge, the behavior of the zinc electrode varied as the electrolyte was changed. Specifically FIGS. 2 and 3 show that the ternary electrolyte combines the discharge behavior of the KOH/K$_3$PO$_4$ binary electrolyte and the charge characteristics of the KOH/KF binary solutions.

The positive electrode behaved similarly in all the electrolytes.

What is claimed is:

1. In a secondary electrochemical cell wherein the active material of one of the electrodes is a zinc-active material, an electrolyte comprised of an aqueous solution of 5 weight % to 10 weight % potassium hydroxide, 5 weight % to 15 weight % potassium fluoride and 10 weight % to 20 weight % potassium phosphate.

2. In a secondary electrochemical cell according to claim 1 wherein said zinc-active material is zinc oxide.

3. In a secondary electrochemical cell according to claim 1 wherein said zinc-active material is elemental zinc.

4. In a secondary electrochemical cell according to claim 1 wherein said zinc-active material is a mixture of zinc oxide and elemental zinc.

5. In a secondary electrochemical cell according to claim 1 wherein said aqueous solution is 7.5 weight % potassium hydroxide, 12.0 weight % potassium fluoride and 16.0 weight % potassium phosphate.

* * * * *